United States Patent
Chen et al.

(10) Patent No.: US 8,196,130 B2
(45) Date of Patent: Jun. 5, 2012

(54) TRI-PHASE BOOT PROCESS IN ELECTRONIC DEVICES

(75) Inventors: Shao-Chun Chen, Aliso Viejo, CA (US); Young Hee Choi, San Diego, CA (US); James P. Gustafson, Irvine, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1337 days.

(21) Appl. No.: 10/932,175

(22) Filed: Sep. 1, 2004

(65) Prior Publication Data
US 2005/0114852 A1    May 26, 2005

Related U.S. Application Data

(63) Continuation-in-part of application No. 10/756,103, filed on Jan. 13, 2004, now Pat. No. 7,725,889.

(60) Provisional application No. 60/439,673, filed on Jan. 13, 2003, provisional application No. 60/500,364, filed on Sep. 3, 2003, provisional application No. 60/249,606, filed on Nov. 17, 2000.

(51) Int. Cl.
*G06F 9/445* (2006.01)
(52) U.S. Cl. ........ 717/168; 717/170; 717/171; 717/172; 717/173; 717/174
(58) Field of Classification Search ................ 717/168
See application file for complete search history.

(56) References Cited

U.S. PATENT DOCUMENTS

| 5,261,055 A | 11/1993 | Moran et al. ............ 395/275 |
| 5,418,837 A * | 5/1995 | Johansson et al. ............ 455/558 |
| 5,442,771 A | 8/1995 | Filepp et al. ............ 395/650 |
| 5,479,637 A | 12/1995 | Lisimaque et al. ............ 395/430 |
| 5,579,522 A | 11/1996 | Christeson et al. ............ 395/652 |
| 5,596,738 A | 1/1997 | Pope ............ 395/430 |
| 5,598,534 A | 1/1997 | Haas ............ 395/200.09 |
| 5,608,910 A | 3/1997 | Shimakura ............ 395/670 |

(Continued)

FOREIGN PATENT DOCUMENTS

CA    2339923    3/2000

(Continued)

OTHER PUBLICATIONS

O'Neill Patrick, J. System and Method for Updating and Distributing Information, Published on May 23, 2002, WO 02/41147 A1, pp. 1-78.*

(Continued)

*Primary Examiner* — Isaac Tecklu

(57) ABSTRACT

An electronic device network including a plurality of electronic devices. The electronic devices may each have updating software adapted to update firmware/software resident in the electronic devices. The electronic devices may also employ additional software for updating the updating software in the electronic devices. The electronic devices may also have software adapted to determine whether a current version of the updating software is to be invoked or whether a previous backup version of the updating software is to be invoked. The determination may be made based upon status information resident in a update status indicator. The status information may indicate that an update upon the updating software is to be conducted, rather than a normal startup operation without performing any updates. The network may also include an update generator adapted to generate updates for use in updating the updating software in the electronic devices.

16 Claims, 9 Drawing Sheets

U.S. PATENT DOCUMENTS

| | | | | |
|---|---|---|---|---|
| 5,623,604 | A | 4/1997 | Russell et al. | 395/200.1 |
| 5,666,293 | A | 9/1997 | Metz et al. | 395/200.5 |
| 5,699,275 | A | 12/1997 | Beasley et al. | |
| 5,752,039 | A | 5/1998 | Tanimura | 395/712 |
| 5,778,440 | A | 7/1998 | Yiu et al. | 711/154 |
| 5,790,974 | A | 8/1998 | Tognazzini | 701/204 |
| 5,878,256 | A | 3/1999 | Bealkowski et al. | 395/652 |
| 5,960,445 | A | 9/1999 | Tamori et al. | 707/203 |
| 6,009,497 | A | 12/1999 | Wells et al. | 711/103 |
| 6,038,636 | A | 3/2000 | Brown, III et al. | 711/103 |
| 6,064,814 | A | 5/2000 | Capriles et al. | 395/701 |
| 6,073,206 | A | 6/2000 | Piwonka et al. | 711/102 |
| 6,073,214 | A | 6/2000 | Fawcett | 711/133 |
| 6,088,759 | A | 7/2000 | Hasbun et al. | 711/103 |
| 6,105,063 | A | 8/2000 | Hayes, Jr. | 709/223 |
| 6,112,024 | A | 8/2000 | Almond et al. | 395/703 |
| 6,112,197 | A | 8/2000 | Chatterjee et al. | 707/3 |
| 6,126,327 | A | 10/2000 | Bi et al. | 395/200.51 |
| 6,128,695 | A | 10/2000 | Estakhri et al. | 711/103 |
| 6,157,559 | A | 12/2000 | Yoo | 365/52 |
| 6,163,274 | A | 12/2000 | Lindgren | 340/825.44 |
| 6,198,946 | B1 | 3/2001 | Shin et al. | 455/561 |
| 6,279,153 | B1 | 8/2001 | Bi et al. | 717/11 |
| 6,311,322 | B1 | 10/2001 | Ikeda et al. | 717/1 |
| 6,438,585 | B2 | 8/2002 | Mousseau et al. | 709/206 |
| 6,512,919 | B2* | 1/2003 | Ogasawara | 455/422.1 |
| 6,671,818 | B1* | 12/2003 | Mikurak | 714/4 |
| 7,082,549 | B2* | 7/2006 | Rao et al. | 714/6 |
| 7,130,807 | B1* | 10/2006 | Mikurak | 705/7 |
| 7,134,050 | B2* | 11/2006 | Wenzel | 714/38 |
| 7,480,907 | B1* | 1/2009 | Marolia et al. | 717/174 |
| 7,725,889 | B2* | 5/2010 | Gustafson et al. | 717/168 |
| 2001/0029178 | A1 | 10/2001 | Criss et al. | 455/419 |
| 2001/0047363 | A1 | 11/2001 | Peng | 707/104.1 |
| 2001/0048728 | A1 | 12/2001 | Peng | 375/354 |
| 2002/0078209 | A1 | 6/2002 | Peng | 709/227 |
| 2002/0116261 | A1 | 8/2002 | Moskowitz et al. | 705/14 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2003/0033599 | A1 | 2/2003 | Rajaram et al. | 717/173 |
| 2003/0037075 | A1 | 2/2003 | Hannigan et al. | 707/500 |
| 2003/0061384 | A1 | 3/2003 | Nakatani | 709/245 |
| 2003/0084434 | A1 | 5/2003 | Ren | |
| 2003/0182414 | A1* | 9/2003 | O'Neill | 709/223 |
| 2003/0224761 | A1* | 12/2003 | Goto | 455/412.1 |
| 2004/0015857 | A1* | 1/2004 | Cornelius et al. | 717/120 |
| 2004/0078455 | A1* | 4/2004 | Eide et al. | 709/223 |
| 2004/0093597 | A1* | 5/2004 | Rao et al. | 717/171 |
| 2004/0168165 | A1* | 8/2004 | Kokkinen | 717/168 |
| 2004/0250245 | A1* | 12/2004 | Rao et al. | 717/168 |
| 2006/0258344 | A1* | 11/2006 | Chen | 455/419 |
| 2007/0169099 | A1* | 7/2007 | Rao et al. | 717/168 |

FOREIGN PATENT DOCUMENTS

| | | |
|---|---|---|
| EP | 1 052 571 A2 | 11/2000 |
| EP | 1052571 A | 11/2000 |
| JP | 8202626 | 8/1996 |
| KR | 2002-0034228 | 5/2000 |
| KR | 2001-0100328 | 11/2001 |

OTHER PUBLICATIONS

"Focus on OpenView A guide to Hewlett-Packard's Network and Systems Management Platform", Nathan J. Muller, pp. 1-291, CBM Books, published 1995.

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

TRI-PHASE BOOT PROCESS IN ELECTRONIC DEVICES

CROSS-REFERENCE TO RELATED APPLICATIONS

This application is a continuation in part of U.S. patent application Ser. No. 10/756,103, entitled "Mobile Handset Capable of Updating Its Update Agent," filed Jan. 13, 2004, now U.S. Pat. No. 7,725,889, which claims priority to Provisional application No. 60/439,673, filed on Jan. 13, 2003.

The present application makes reference to, claims priority to, and the benefit of U.S. Provisional Patent Application 60/500,364 entitled "TRI-PHASE BOOT PROCESS IN A MOBILE HANDSET", filed Sep. 3, 2003, the complete subject matter of which is hereby incorporated herein by reference in its entirety.

The present application also hereby incorporates herein by reference in its entirety, the complete subject matter of U.S. Provisional Patent Application 60/439,673, filed Jan. 13, 2003.

The present application also hereby incorporates herein by reference in its entirety, the complete subject matter of PCT Application having publication number WO 02/41147 A1 and PCT application number PCT/US01/44034, filed on Nov. 19, 2001.

The present application also hereby incorporates herein by reference in its entirety, the complete subject matter of U.S. Provisional Patent Application 60/249,606 filed on Nov. 17, 2000.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and/or software applications that are either provided by the manufacturers of the electronic devices, by telecommunication carriers, or by third parties. These firmware and software applications often contain bugs. New versions of firmware and software are periodically released to fix the bugs and/or to introduce new features.

Update programs, code, or functions employed to update the firmware and/or software components in electronic devices may also need to be changed, modified, and/or updated. Programs may be updated by employing an update agent. An update agent may comprise software for updating one of firmware and/or software. Updating the update agent in an electronic device, for example a mobile handset, may be challenging. If the update is not executed properly, the update agent may be rendered inoperable and/or become corrupted.

Further limitations and disadvantages of conventional and traditional approaches will become apparent to one of ordinary skill in the art through comparison of such systems with the present invention as set forth in the remainder of the present application with reference to the drawings.

SUMMARY OF THE INVENTION

Aspects of the present invention may be found in an update status indicator for use in updating one of firmware and software in a mobile electronic device. The update status indicator may comprise an update address block of memory. The update address may identify where an updating software is stored in the electronic device. The update status indicator may also comprise a return block of memory comprising a value to be returned when updating the electronic device has been completed and an indicator block of memory comprising a plurality of status indicators.

In an embodiment according to the present invention, the plurality of status indicators may be employed by updating software comprising a plurality of executable instructions for converting a first version of software to a second version of software.

In an embodiment according to the present invention, at least one of the plurality of status indicators may be employed to indicate that an update is present in the electronic device and that an update is to be performed.

In an embodiment according to the present invention, at least one of the plurality of status indicators may be employed to indicate whether the software to be updated is valid and capable of being updated.

In an embodiment according to the present invention, at least one of the plurality of status indicators may be employed to indicate which pass through the software to be updated that the update is currently performing.

In an embodiment according to the present invention, at least one of the plurality of status indicators may be employed to indicate that the update of the software to be updated is completed.

Aspects of the present invention may be found in a memory configuration for a mobile electronic device comprising a software for booting the electronic device located in a first portion of memory, an updating software for updating one of firmware and software in the electronic device located in a second portion of memory, a reserved portion of memory usable for backing up one of code and information during an updating event, and at least one additional portion of memory for storing an update usable by the updating software during the updating event. Updating one of software and firmware in the electronic device may comprise executing a plurality of executable instructions for converting a first version of one of software and firmware to a second version of one of software and firmware.

In an embodiment according to the present invention, the updating software may be updatable in a fault tolerant manner.

In an embodiment according to the present invention, the memory configuration may comprise non-volatile memory.

In an embodiment according to the present invention, software and firmware may be stored in the memory configuration in a compressed form and may be decompressed out of the memory configuration into random access memory for one of processing and updating.

Aspects of the present invention may be found in an updating software employable for updating one of software and firmware in a mobile electronic device. The updating software may comprise a software component. The software component may be adapted to survey and validate one of software and firmware to be updated in the electronic device to determine that the one of software and firmware are capable of being updated. The software component may also be adapted to identify an update interruption.

In an embodiment according to the present invention, identifying an update interruption may provide a fault tolerant update and may permit an interrupted update to be re-initiated where the interruption occurred.

Aspects of the present invention may be found in an update software wrapper employable in conjunction with updating software for updating one of software and firmware in a mobile electronic device. The update software wrapper may be adapted to facilitate interaction between electronic device specific software and application specific software.

In an embodiment according to the present invention, electronic device specific software may comprise software adapted to operate in a particular manufacturers electronic device models.

In an embodiment according to the present invention, application specific software may comprise software adapted to perform a specific function that is independent of a particular manufacturers electronic device models.

In an embodiment according to the present invention, the update software wrapper may further comprise software combining manufacturer dependent electronic device model root code and update information adapted to perform application specific updates independent of manufacturer electronic device models to permit interaction and interfacing of generated updates and particular manufacturer electronic device model one of firmware and software.

In an embodiment according to the present invention, the update software wrapper may be adapted to call a flash erase function before a flash write function of at least one component of a memory module.

In an embodiment according to the present invention, the update software wrapper may be adapted to manage and adjust at least one of evaluation settings, update variables, and update functions.

Aspects of the present invention may be found in a mobile electronic device comprising a software adapted to update an updating software resident in the electronic device in a non-fault-tolerant manner and a fault-tolerant manner.

In an embodiment according to the present invention, updating the updating software in a fault tolerant manner may comprise storing a backup copy of the updating software in non-volatile memory prior to initiation of an update event.

Aspects of the present invention may be found in a mobile electronic device comprising at least two program files stored in a non-volatile memory configuration. The at least two program files may comprise at least one of code and data usable for booting an electronic device. The at least two program files may be adapted to call associated boot instructions from different locations in memory depending upon a status of a software to be updated.

In an embodiment according to the present invention, the at least two program files may be binary files.

In an embodiment according to the present invention, the at least two program files may be adapted to perform boot activities at different times.

In an embodiment according to the present invention, one of the at least two program files may be adapted to boot updating software from a default start location in non-volatile memory and another of the at east two program files may be adapted to boot updating software from a reserved backup location in non-volatile memory.

In an embodiment according to the present invention, the at least two program files may each be associated with additional block of re-locatable code that is copied from a default location to a reserved backup location to provide fault tolerance prior to initiation of a fault tolerant update of updating software resident in the electronic device.

In an embodiment according to the present invention, the mobile electronic device may further comprising software for booting the electronic device. The software for booting may be adapted to invoke at least one of the at least two program files to initialize and relocate updating software to be updated and an associated block of re-locatable code from storage in non-volatile memory to a random access memory for one of booting, processing, and updating.

These and other advantages, aspects, and novel features of the present invention, as well as details of illustrated embodiments, thereof, will be more fully understood from the following description and drawings.

DETAILED DESCRIPTION OF THE INVENTION

Figure 1:
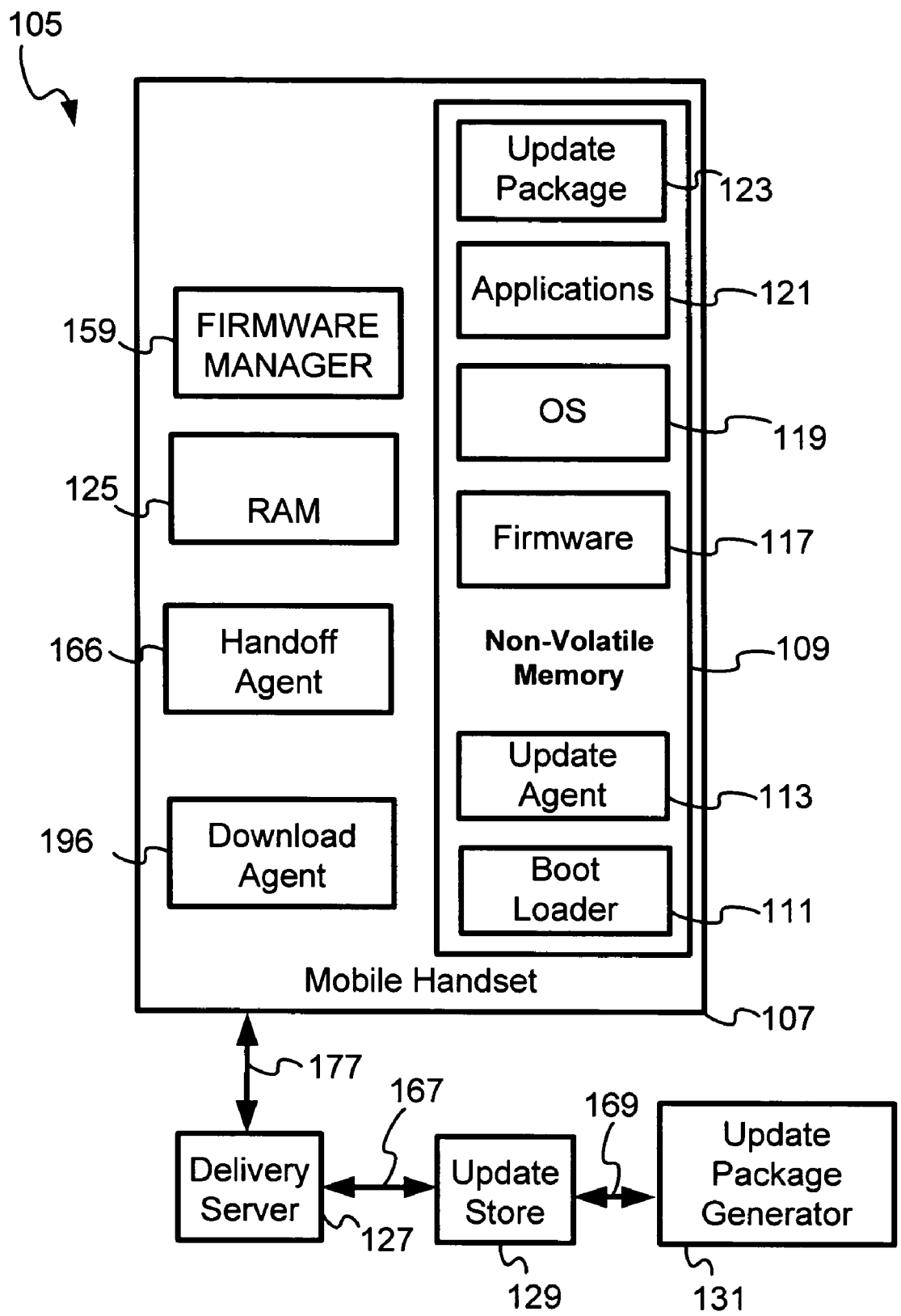
FIG. 1 is a block diagram illustrating an exemplary provisioning system comprising an electronic device communicatively coupled to a delivery server in accordance with an embodiment of the present invention.

Electronic devices may be adapted to access servers to retrieve update information for updating electronic devices. An electronic device may be, for example, a mobile electronic device having software/firmware, such as, mobile cellular phone handsets, personal digital assistants (PDA's), pagers, MP3 players, digital cameras, etc.

Update information may comprise information that modifies, converts, or changes firmware and/or software components installed in the mobile electronic device. Update information may also add new services to the mobile electronic device, as desired by a service provider, device manufacturer, or an end-user. Update information may also comprise information that modifies, converts, or changes software capable of performing updates upon other firmware and/or software components installed in the mobile electronic device.

Aspects of the present invention may be found in a fault tolerant method of updating software and/or firmware. The software and/or firmware may be stored in compressed form in a non-volatile memory device, for example, a flash memory device. The software and/or firmware may comprise program instructions, code, information and/or data. The non-volatile memory may be erased before reprogramming. In another embodiment according to the present invention, the non-volatile memory may be overwritten, with or without being erased, during updating and/or reprogramming.

In an embodiment according to the present invention, a fault tolerant method of updating software and/or firmware may comprise preventing loss of information, in the event that power failure occurs during an updating and/or reprogramming event. In an embodiment according to the present invention, a fault tolerant method of updating software and/or firmware may comprise ensuring continuity of an updating and/or reprogramming procedure, in the event that power failure occurs during the updating and/or reprogramming procedure. In an embodiment according to the present invention, a fault tolerant method of updating software and/or firmware may comprise preventing corruption and/or invalidation of the software and or firmware, in the event that power failure occurs during an updating and/or reprogramming event.

In an embodiment according to the present invention, software and/or firmware to be updated in the electronic device may comprise program code and/or data. The program code and/or data may be organized/arranged in units or blocks. The blocks may also be called banks, compressed units/blocks, and decompressed units/blocks herein.

In an embodiment according to the present invention, an update package generator may be adapted to generate an update package comprising a plurality of update units/blocks for use in updating one of firmware and/or software in the electronic devices. An update block/unit may be defined as a block containing information and/or executable program instructions usable to update a block of information to be updated.

An update (update package) may comprise a firmware/software update that may be used to modify or change a version of a particular firmware/software, for example, upgrading to a newer version. Updating software (update agent) used for updating firmware and/or software, may be stored in the electronic device. The updating software may be referred to herein as an update agent. The update agent may also be updated by an update (update package) generated in the update package generator.

In an embodiment according to the present invention, the update package may comprise, for example, a set of executable instructions for converting a first version of firmware/software ("code") to a second version of code. In an embodiment according to the present invention, an update package may also add new services to the electronic device or delete services, as desired by the service provider or an end-user. An update package may also be referred to in abbreviated form herein as an update. Updating one of firmware/software in a mobile electronic device may comprise performing the set of executable instructions and converting a first version of firmware/software ("code") to a second version of code.

In an embodiment according to the present invention, an electronic device network adapted to support a plurality of electronic devices may comprise an update package generator. The update package generator may be adapted to generate updates (update packages) comprising a plurality of update units/blocks. The update units/blocks may comprise the set of executable instructions for converting a first version of firmware/software ("code") to a second version of code.

In an embodiment according to the present invention, generating an update package may comprise overwriting information/code resident in an existing/previous update package with new or different (updated) information. For example, an update package comprising a plurality of executable program instructions may have previously been generated (and employed) to update a firmware in a mobile electronic device, for example, from firmware version 2 to firmware version 3. The update may be called update 2-3, for example. To generate an update package for updating firmware in an electronic device from firmware version 3 to firmware version 4 (update 3-4), for example, the previous update package (update 2-3) may be modified (executable instructions/code/data may be added, deleted, and/or overwritten) to economically generate the update package for updating firmware in an electronic device from firmware version 3 to firmware version 4 (update 3-4). In this manner, the update package generator may not have to generate an entirely new update package, but rather the update generator may be adapted to recycle a previous update package using at least some new/different executable instructions.

In an embodiment according to the present invention, generating an update may comprise writing and organizing in memory information/code creating a new update package. An update package may be built using a plurality of blocks of update information.

In an embodiment according to the present invention, an update (update package) generated by the update package generator in the electronic device network may be compressed for transmission to a plurality of electronic devices having firmware/software to be updated. The compressed update package may also be decompressed after being received in the electronic device.

FIG. 1 is a block diagram illustrating an exemplary provisioning system 105 comprising an electronic device, for example, mobile handset 107 in accordance with an embodiment of the present invention. The electronic device, for example, mobile handset 107, may be communicatively coupled to a delivery server 127 in an electronic device network via a communications link 177. The communication link 177 may be one of a wire or wireless communication link.

In an embodiment according to the present invention, the delivery server 127 may be disposed in a wireless/carrier electronic device network remote from the electronic device, for example mobile handset 107. The delivery server 127 may also be communicatively coupled to an update store 129 via a communications link 167. The communication link 167 may be one of a wire or wireless communication link. The update store 129 may be a repository of update packages generated by an update package generator 131. The update store 129 may also be communicatively coupled to the update package generator 131 via a communication link 169. The communication link 169 may be one of a wire or wireless communication link.

In an embodiment according to the present invention, the electronic device, for example, mobile handset 107 may comprise a non-volatile memory (NVM) 109 and a firmware manager 159. The NVM 109 may comprise a boot loader 111, an update agent 113, a firmware 117, an operating system (OS) 119, electronic device applications 121, and an update package 123, for example. The update agent 113 may, for example, comprise software for updating at least one of the firmware 117, the operating system 119, and/or the electronic device applications 121 of the electronic device, for example, mobile handset 107, by employing the update package 123. In an embodiment according to the present invention the update agent 113 may also be updated. The update package generator 131 in the electronic device network may also be adapted to generate an update package, for example update package 123, for use in updating the update agent 113.

In an embodiment according to the present invention, the update agent 113 may be adapted to employ a random access memory (RAM) device 125 as temporary update storage/processing memory to update the firmware 117, the operating system 119, and/or the electronic device applications 121. The RAM 125 may also be used as temporary update storage/processing memory during an update of the update agent 113. The update agent 113 may be adapted to update the firmware 117, the operating system 119, and/or the electronic device applications 121 in a fault-tolerant manner. In an embodiment according to the present invention, the update agent 113 may also be updated in a fault tolerant manner.

In an embodiment according to the present invention, the boot loader 111 may be executed during startup or reboot, for example. The boot loader 111 may be capable of determining whether to execute the update agent 113. The boot loader 111 may also be capable of determining that an update package, for example update package 123, is present and that an update of one of the firmware 117, the OS 119, electronic device applications 121, and/or the update agent 113 is to be performed.

In an embodiment according to the present invention, determining whether to execute the update agent 113 may, for example, be facilitated by the boot loader 111 accessing and evaluating at least one status flag/indicator associated with a generated update package, for example, update package 123. In an embodiment according to the present invention, a status flag/indicator may also be evaluated by the boot loader 111 to determine whether the update agent 113 is to be updated. If an update is to be conducted, the boot loader 111 may evaluate the update agent 113 to determine whether the update agent 113 is valid and useable for performing the update, or corrupted and incapable of performing the update, for example.

In an embodiment according to the present invention, whether to execute the update agent 113 may be determined by the boot loader 111 by computing and evaluating a cyclic redundancy check (CRC) and/or checksums, for example. The CRC and/or checksums may be compared to previously computed reference values by the boot loader 111.

In an embodiment according to the present invention, during the update of an update agent, for example update agent 113, if the update procedure is interrupted, then the update agent 113 may be left in a state of partial update. A partially updated update agent may be unusable, inoperable, and/or corrupted. To avoid rendering inoperable and/or corrupting the update agent, for example update agent 113, a backup copy of the update agent 113 to be updated may be created, stored, and maintained in the NVM 109 prior to initiation/performance of the update procedure. A status flag/indicator may also be used to alert/notify the boot loader 111 that an update of the update agent is partially completed and further may indicate where the update was interrupted, for example.

In an embodiment according to the present invention, a fault tolerant (recoverable) update of the update agent may therefore be ensured. If the update agent being updated, for example update agent 113, is rendered inoperable or corrupted by a failure during the update procedure, the unmodified backup copy of the update agent may be recovered from memory, for example NVM 109, wherein the update may subsequently be re-initiated where the update was interrupted, for example. If, during reboot or startup, it is determined that the partially updated or improperly updated update agent is corrupted and/or inoperable, then the backup copy of the update agent stored in NVM 109 may be invoked by boot loader 111, and the update procedure may be re-initiated/re-executed. A status flag/indicator may also be employed to alert/notify the boot loader 111 that the update agent, for example update agent 113, is corrupted and/or inoperable.

In an embodiment according to the present invention, the boot loader 111 may be adapted to determine whether the current update agent 113 is to be invoked (a default bootstrapping), whether the update agent is to be updated, or whether a backup version of the update agent 113 in NVM 109 is to be invoked. The determination may be made based upon status information, (status flags/indicators), for example, whether an update is to be conducted and/or whether a normal startup operation without updates is to be conducted.

In an embodiment according to the present invention, the electronic device may also comprise a handoff agent 166 capable of facilitating the setting of status information (status flags/indicators) and memory location addresses after an update package, for example update package 123, is downloaded to the electronic device from delivery server 127. In an embodiment according to the present invention, the electronic device may also comprise a download agent 196. The download agent 196 may be capable of facilitating the downloading of update packages, for example update package 123.

Figure 2:
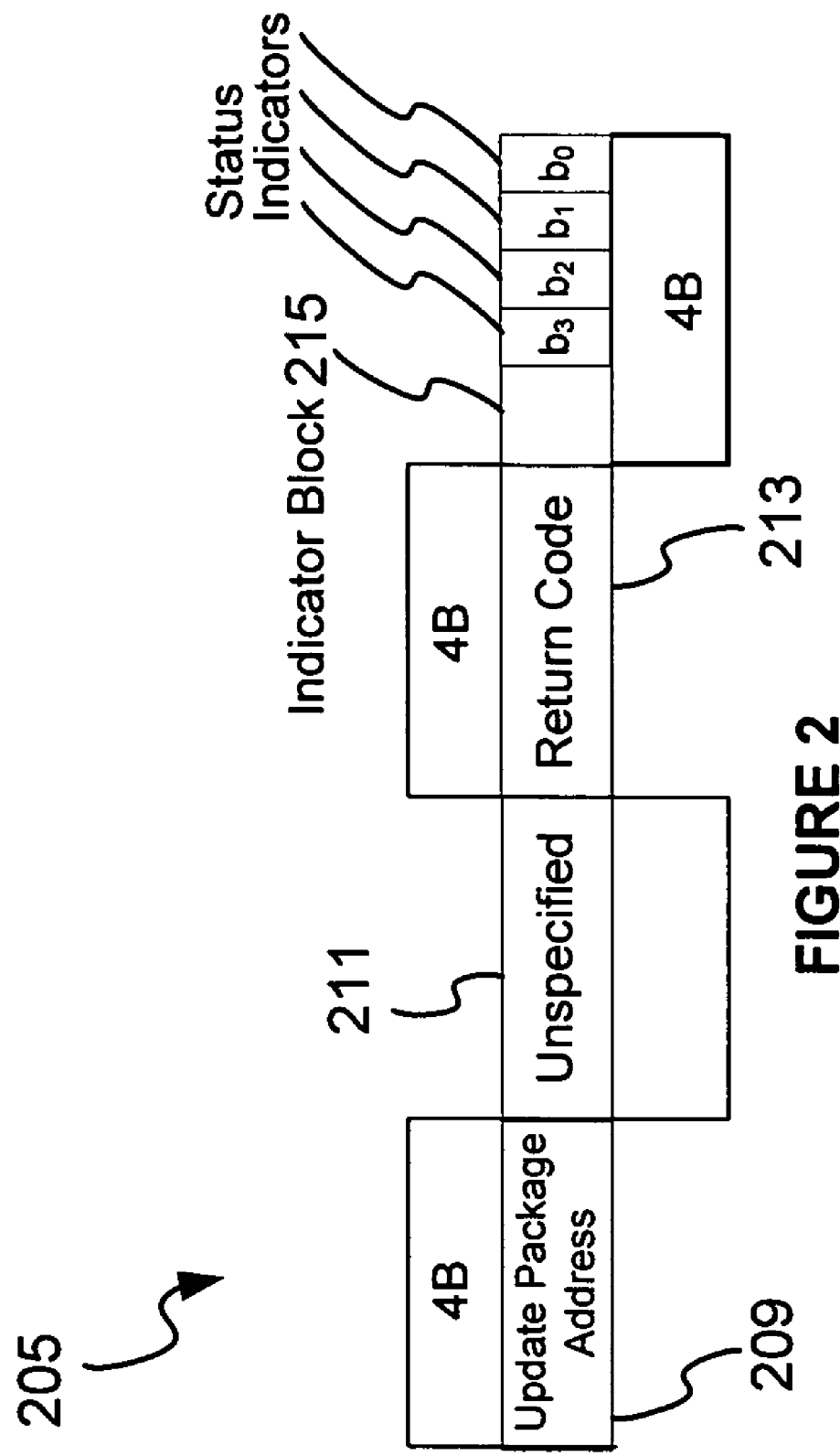
FIG. 2 is a block diagram illustrating an exemplary update status component comprising at least an update package address, an indicator block, a return code, and an unused/unspecified portion in accordance with an embodiment of the present invention.

FIG. 2 is a block diagram illustrating an exemplary update status indicator 205. The update status indicator 205 may be stored in non-volatile memory, such as for example, NVM 109 illustrated in FIG. 1. The update status indicator may accompany an update package and/or be part of a generated update package being downloaded to an electronic device. The update status indicator 205 may be 32 bytes long, for example. The update status indicator 205 may at least comprise an update package address 209, an indicator block 215, a return code 213, and a unused/unspecified portion 211. The update package address 209 may be 4 bytes long, for example. The indicator block 215 may be 4 bytes long, for example. The return code also may be 4 bytes long, for example. The indicator block 215 of update status indicator 205 may comprise a plurality of status flags/indicators that may be evaluated by the boot loader 111 to determine whether an update is to be performed, an update is partially completed, the update agent is corrupted, etc.

In an embodiment according to the present invention, an update agent, for example update agent 113 illustrated in FIG. 1, may employ the update package address 209 to retrieve an update package, for example update package 123. The retrieved update package 123 may be employed to update the firmware 117, the operating system 119, and/or applications 121. The retrieved update package 123 may also be employed to update the update agent 113 illustrated in FIG. 1.

In an embodiment according to the present invention, the indicator block 215 may comprise a plurality of status flags/indicators, for example, $b_0$, $b_1$, $b_2$, and $b_3$. The exemplary indicators, ($b_0$, $b_1$, $b_2$, and $b_3$) in indicator block 215 may be employed by the boot loader to control invocation of the update agent 113, for example. Flags, addresses, indicators, security information, and additional device status information may also be employed in the update status indicator 205 to indicate the status of functions associated with corresponding firmware, software, hardware, and other code/data/information.

In an exemplary embodiment according to the present invention, the exemplary indicators ($b_0$, $b_1$, $b_2$, and $b_3$) may be provided with the following exemplary definitions, for example.

In an embodiment according to the present invention, the indicator $b_0$ may comprise an update indicator, for example. The indicator $b_0$ may be set by a handoff agent, for example handoff agent 166 illustrated in FIG. 1. The indicator $b_0$ may be set to 0 to indicate that an update package 123 is present and an update is to be performed. The default/initial value for indicator $b_0$ may be 1, for example.

In an embodiment according to the present invention, the indicator $b_1$ may comprise a validation phase indicator, for example. When the validation phase has been completed, the value of indicator $b_1$ may be set to 0 in a plurality of device wrappers. The default/initial value for indicator $b_1$ may be 1, for example. A device wrapper may comprise a software interface adapted to permit generic software to interact with a particular version of software. For example, electronic device manufacturers may each provide unique particular firmware in a corresponding electronic device model. Electronic device update generating companies may not be provided the proprietary or root code provided in the manufacturer's electronic devices. The electronic device update generating companies may generate generic update packages adapted to perform specific updates on any electronic device, regardless of manufacturer, for example an update agent. Therefore, device wrappers are developed to permit interaction/interfacing of the generic updating software and the particular electronic device firmware/software. Wrappers facilitate reuse of update agent code without customization of the update agent.

In an embodiment according to the present invention, the indicator $b_2$ may indicate a transform 1 phase, for example. Updating firmware/software may comprise multiple passes (updating passes) through the software before the update is completed. A transform phase indicator may comprise an indicator alerting/notifying the boot loader 111 which pass or phase the update was performing when, for example, the update was interrupted, or when the electronic device rebooted as part of the update. A transform 1 phase indicator, for example, $b_2$, may indicate that the update had completed or was involved in a first pass of phase through the software when the device rebooted or the update was interrupted. When the transform 1 phase has been completed, the value of indicator $b_2$ may be set to 0 in a plurality of device wrappers. The default/initial value for indicator $b_2$ may be 1, for example. A plurality of transform indicators may reside and be evaluated in indicator block 215 depending on the number of passes or phases that an update may be deemed to make in performing an update. In an exemplary embodiment according to the present invention, three transform phases may be employed, for example, a pre-processing phase (transform 1, for example), an updating phase (transform 2, for example), and a post-processing phase (transform 3, for example).

In an embodiment according to the present invention, the indicator $b_3$ may comprise an update completion indicator, for example. When an update has been completed, the value of indicator $b_3$ may be set to 0. The default/initial value for indicator $b_3$ may be 1, for example.

In an embodiment according to the present invention, when indicator $b_0$ is set to 0 and indicator $b_3$ is set to 1, an update may be initiated, for example.

In an embodiment according to the present invention, when an update procedure is completed, the return code 213 illustrated in FIG. 2 may be set to a return value provided by the boot loader 111, update package 123, the update agent 113, and/or an update agent (UA) software development kit (SDK). The UASDK may comprise a library comprising plurality of functions associated with the device wrappers, the update agent 113, the update package 123, and the boot loader 111. In another embodiment according to the present invention, the plurality of function may be miscellaneous functions that are not directly related to any particular software, but may comprise information and/or data used to carryout miscellaneous functions, for example.

In an embodiment according to the present invention, the update package address 209 illustrated in FIG. 2 may comprise 4 bytes (4B), for example. The 4 bytes of the update address block 209 may be used to store the address in NVM 109, illustrated in FIG. 1, of an update package, for example update package 123.

Aspects of the present invention may be found in a tri-phase method of booting and updating an electronic device. In a first phase boot/reboot, also referred to as a default boot/reboot, the electronic device may boot/reboot firmware/software in the electronic device and initiating normal operation, for example.

In a second phase update boot/reboot, the electronic device may boot/reboot and update any and/or all firmware/software in the electronic device. However, if the update agent 113 is being updated, a backup copy of the update agent 113 may be stored in NVM 109, for example, before updating the update agent. The second update boot/reboot method is fault tolerant because if a failure occurs during updating the update agent 113, catastrophic failure may be avoided because the backup copy of the original update agent 113 may be invoked.

In the third phase update boot/reboot, the electronic device may boot/reboot and update any and/or all firmware/software in the electronic device. However, in this method the boot loader 111 may determine that the update agent 113 is improperly updated. Therefore, during the boot/reboot, the backup copy of the update agent 113 is invoked and decompressed out of NVM 109 into RAM 125, and a catastrophic failure is averted. The third update boot/reboot method is fault tolerant because if a failure during the update of the update agent 113 is detected, catastrophic failure is avoided because the backup copy of the original update agent 113 remains usable.

Aspects of the present invention may also be found in integrating an update agent, for example update agent 113 illustrated in FIG. 1, comprising updating software into electronic devices, such as for example, mobile handset 107 also illustrated in FIG. 1.

Aspects of the present invention may also be found in an update package generator, such as update package generator 131 illustrated in FIG. 1. The update package generator 131 may be capable of generating update packages for updating at least one of the firmware 117, the OS 119, electronic device applications 121, and the update agent 113 in an electronic device, such as for example, mobile handset 107, all illustrated in FIG. 1, by employing a command line for the electronic device images. A command line may comprise a textual interface for entering commands to a processing device, as opposed to a graphical interface for entering commands. The present invention is not limited to a command line interface but may also comprise a graphical interface in another embodiment according to the present invention.

In an embodiment according to the present invention, the update agent software development kit (UASDK) may comprise a UASDK engine. The UASDK engine may comprise the minimum functionality to perform an update.

In an embodiment according to the present invention, an exemplary electronic device, such as for example, mobile handset 107 may comprise the following configuration and/or specifications. The electronic device may comprise a flash-type non-volatile memory, such as for example, NVM 109. The flash-type non-volatile memory 109 may be, for example, an AMD DS42585 designed by Advanced Micro Devices, Inc. The AMD DS42585 is a 32 Megabit (4 M×8-

Bit/2 M×16-Bit) top boot flash & 8 Mbit (1 M×8-Bit/512 K×16-Bit) static RAM device having a bank size of 64 KB, a boot block size of 8 KB *8, a code size of 7 MB (0x0-0x700000), and RAM of 1 MB (0x1200000-0x1300000).

Figure 3:
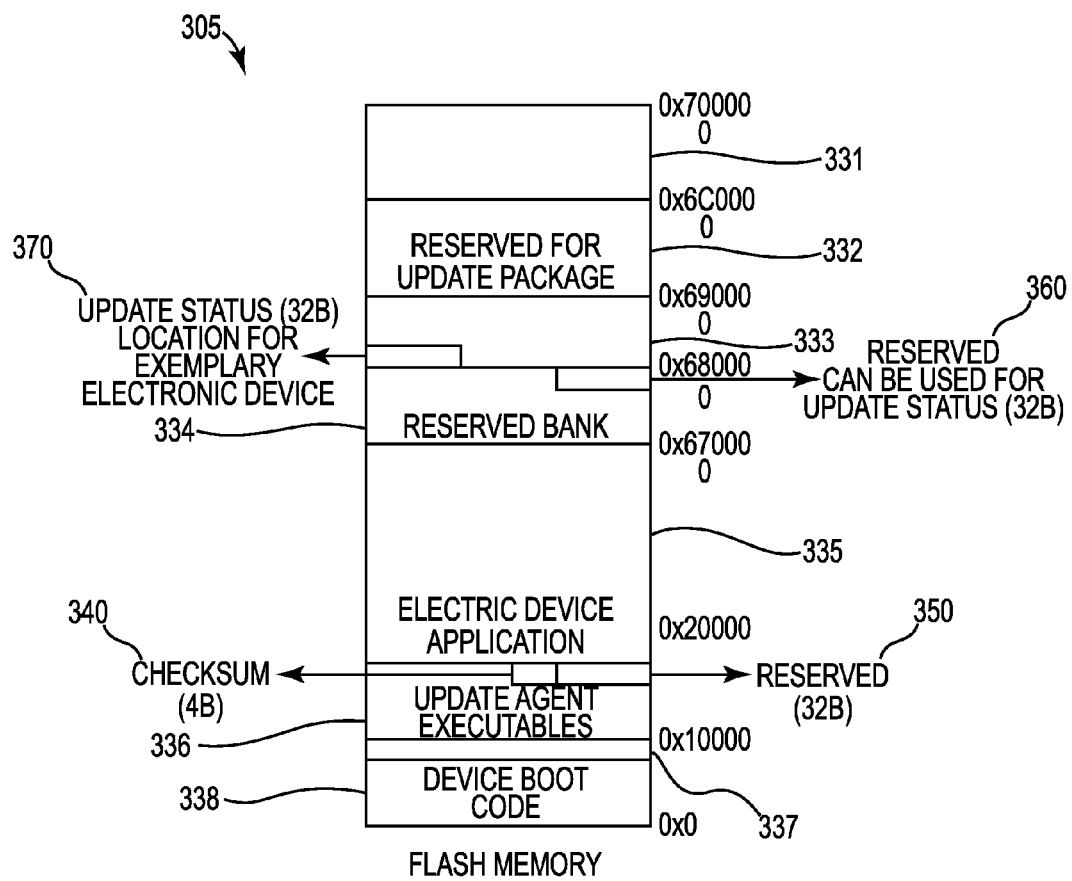
FIG. 3 is a block diagram illustrating an exemplary memory configuration for an exemplary electronic device in accordance with an embodiment of the present invention.

FIG. 3 is a block diagram illustrating an exemplary memory configuration 305 of a flash memory for an exemplary electronic device, such as for example, the mobile handset 107 illustrated in FIG. 1, in accordance with an embodiment of the present invention.

The exemplary flash memory 305 illustrated in FIG. 3 may comprise a block of memory 338 for storing an electronic device boot code and an unspecified block of memory 337. The exemplary flash memory 305 may also comprise a block of memory 336 for storing update agent executables. The block of memory 336 for storing update agent executables may be further sub-divided into a reserved block 350 and a checksum block 340. The reserved block 350 may be 32 bytes long, for example. The checksum block 340 may be 4 bytes long, for example.

The exemplary flash memory 305 may also comprise a block of memory 335 for storing electronic device applications and a reserved bank of memory 334. The reserved bank of memory 334 may also be sub-divided into another reserved block of memory 360. The reserved block of memory 360 may be used for storing an update status indicator, such as for example, the update status indicator 205 illustrated in FIG. 2. The reserved block of memory 360 may be 32 bytes long, for example.

The exemplary flash memory 305 may also comprise an unspecified block of memory 333. The unspecified block of memory 333 may also be sub-divided into an update status block 370. The update status block 370 may be used for storing an update status indicator, such as for example, the update status indicator 205 illustrated in FIG. 2. The update status block 370 may be 32 bytes long, for example.

The exemplary flash memory 305 illustrated in FIG. 3 may also comprise a block of memory 332 reserved for receiving and storing an update package, for example. The exemplary flash memory 305 may also comprise another unspecified block of memory 331.

In an embodiment according t the present invention, to make a tri-phase booting test demonstrable, two update packages may be flashed/stored in memory block 332, for example, as illustrated in FIG. 3. The update packages may comprise a base version and a base version converted to a new version, for example.

In an embodiment according to the present invention, the update status blocks 360 and 370 may comprise the last and first 32 bytes of reserved bank of memory 334 and unspecified memory block 333, respectively. However, if a problem occurs in accessing the data/information during an initialization/boot/reboot, the update status blocks 360 and 370 may be changed/moved to another different available location.

In an embodiment according to the present invention, the reserved block of memory 360 and the update status block 370 may both be 32 bytes long, for example. The blocks may be used to detect the status of and facilitate initiation of the update agent 113 and alerting/notifying the UASDK, the boot loader 111, and/or the handoff agent 166 of the status of the update agent 113, for example.

In an embodiment according to the present invention, the handoff agent 166, the firmware manager 158, the download agent 196, etc. may not originally be integrated into the electronic device image permitting the update agent 113 to be tested during manual downloading of an update package 123 using JTAG flash programming, for example. JTAG comprises a standard specification of an interface for testing integrated circuits. JTAG permits detecting of status and control of integrated circuit functionality.

In an embodiment according to the present invention, an electronic device menu may be enabled to set the exemplary update indicator bits ($b_0$, $b_1$, $b_2$, and $b_3$, for example) in the update status indicator block 205. In another embodiment according to the present invention, the handoff agent 166 may be enabled to set the exemplary update indicator bits ($b_0$, $b_1$, $b_2$, and $b_3$, for example) in the update status indicator block 205.

In an embodiment according to the present invention, baseline implementations, such as for example, for security and authentication implementations, may be used to create a valid electronic device image updatable employing the update agent 113. Baseline implementations may comprise, for example, a checksum implementation, such as for example, a cyclic redundancy check (CRC32), a compression implementation, such as for example, bfzlib compression, a security implementation, such as for example, MD5 with RSA, a predictor implementation, such as for example, a predictor for a thumb processor (by ARM) developed by Bitfone Corp., a surveyor implementation (update agent validation and update interruption/failure identification), a heap module implementation, and a utility interface implementation.

In an embodiment according to the present invention, to test the functionality of the update agent 113, the electronic device may also be programmed so that all possible electronic device features are integrated and present in the electronic device. Electronic device testing features may comprise testing fault tolerant updating of firmware/software, testing fault tolerant updating of the update agent 113, testing the tri-phase booting method, and testing a thumb prediction method.

In an embodiment according to the present invention, the handoff agent 166 may not be available for testing, but handoff agent interfaces and device wrappers may be employed.

In an embodiment according to the present invention, a UASDK Library may comprise a single library provided for the implementation of the functionality of the update agent 113. In another embodiment according to the present invention, a UASDK Library may comprise a plurality of application-specific libraries provided for implementing the functionality of the update agent 113. All of the baseline update agent functionality may be included in the library/libraries as well as all currently available update agent plug-ins. Functionality may be compiled for a particular target electronic device environment.

In an embodiment according to the present invention, the UASDK library/libraries may comprise a set(s) of source directories. At integration time, files adapted for linking and compiling the update agent 113 may be selected by adjusting electronic device interfaces and device wrappers.

Figure 4:
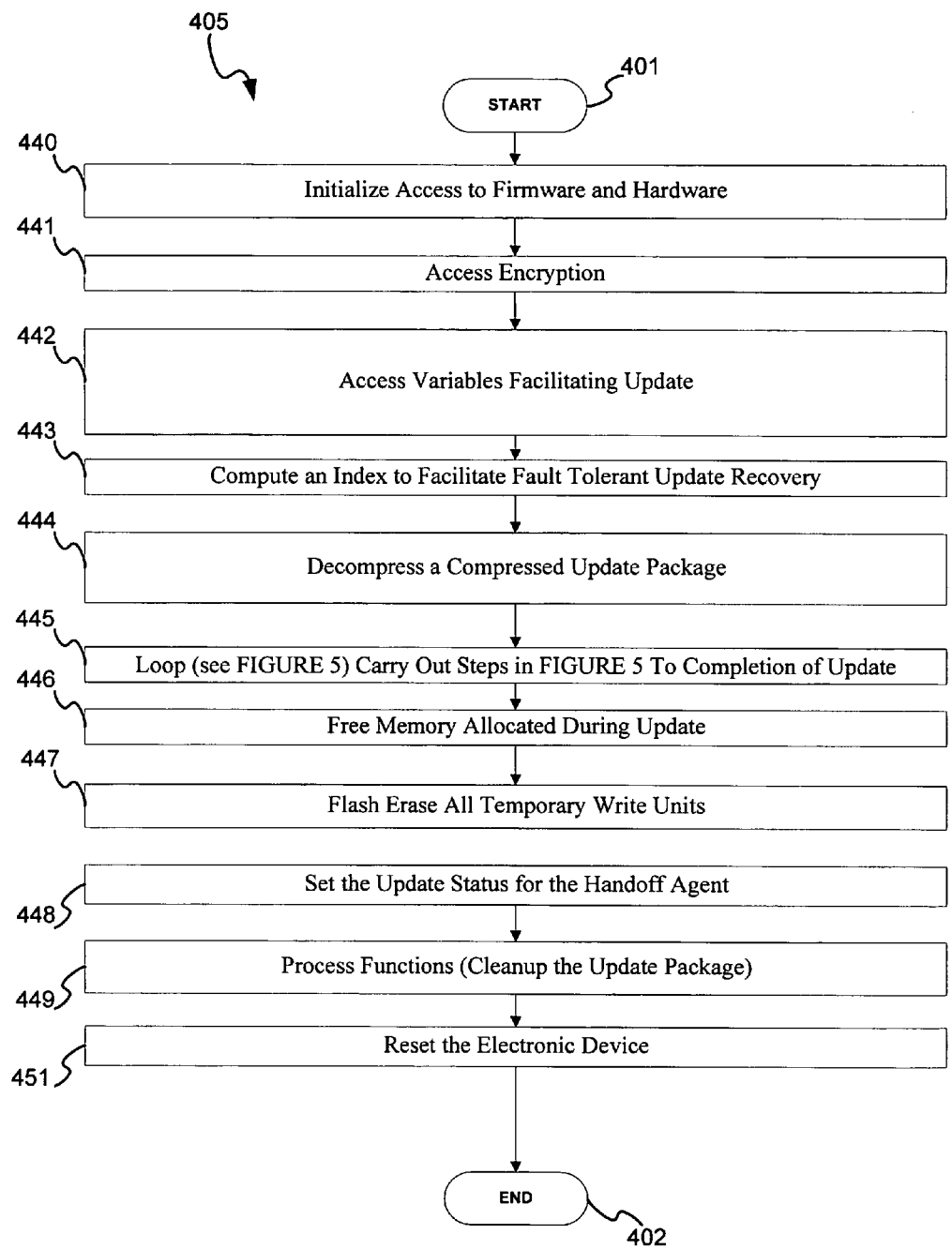
FIG. 4 is a flow diagram illustrating an exemplary method of fault tolerant updating of an update agent in an exemplary electronic device in accordance with an embodiment of the present invention.

FIG. 4 is a flow diagram 405 illustrating an exemplary method of fault tolerant updating of any of the firmware 117, the software applications 121, the operating system (OS) 119, and the update agent 113 in an exemplary electronic device in accordance with an embodiment of the present invention.

The exemplary method illustrated in FIG. 4 may be used to update firmware/software using the UASDK engine, electronic device interfaces, and device wrappers resident in the baseline library/libraries. The following implementation/method illustrates how to use the engine prototypes, interface functions, and wrapper/driver functions during an update. In an embodiment according to the present invention, the ua_Main_Start() function is an exemplary module initiating the update of a target firmware.

The method may begin at start (block 401). The method may comprise initializing access to one of the firmware 117, hardware components, the operating system (OS) 119, the software applications 121, and/or the update agent 113 (block 440). Initializing access to software/firmware may also comprise initializing access to device wrapper functions exposing/decompressing data from non-volatile flash memory 109 into RAM 125, for example.

The method may also comprise accessing the encryption (block 441). Accessing the encryption (encryption engine/software) (block 441) may comprise accessing a public key, such as, a 261-byte public key, a 1024-byte public key, etc., for example.

The method may also comprise accessing variables facilitating the update of the electronic device (block 442). Accessing variables to be used to facilitate the update of the electronic device may comprise dynamically allocating a plurality of global variables used by the UASDK, for example. A void pointer may also be sent to the UASDK engine for initialization. The void pointer may persist throughout the entire update.

The method may also comprise computing an index to facilitate fault tolerant update recovery (block 443). The method may also comprise decompressing a compressed update package from non-volatile memory 109 to RAM 125, for example, (block 444). The method may also comprise obtaining a decompressed update package from a compressed update package by employing a compression implementation, such as for example, the zlib compression plug-in. The method may also comprise a loop of instructions that may be repeated within the implementation until the update is completed (see FIG. 5 for the loop steps) (block 445). After completing the loop of instructions illustrated in FIG. 5, the method may continue as follows.

The method may comprise freeing memory allocated for use during the update (block 446). Freeing the allocated memory may also comprise freeing memory from a cyclic redundancy check (CRC) table or checksum table, for example.

The method may also comprise flash erasing all temporary write units/blocks/banks set-aside, allocated, and/or used during the update (block 447). Flash erasing the temporary write units may also comprise issuing a flash-erase command. The method may also comprise freeing memory allocated for a plurality of global variables. The method may also comprise setting an update status flag/indicator in an update status indicator 205 for the handoff agent 166 (block 448).

The method may also comprise cleaning up the update package, for example, update package 123 illustrated in FIG. 1 (block 449). Cleaning up the update package 123 may comprise processing the device wrapper functions employed during the update. The method may also comprise resetting the electronic device (block 451). Resetting the electronic device may also comprise rebooting the electronic device. The method illustrated in FIG. 4 may end at block 402.

Figure 5:
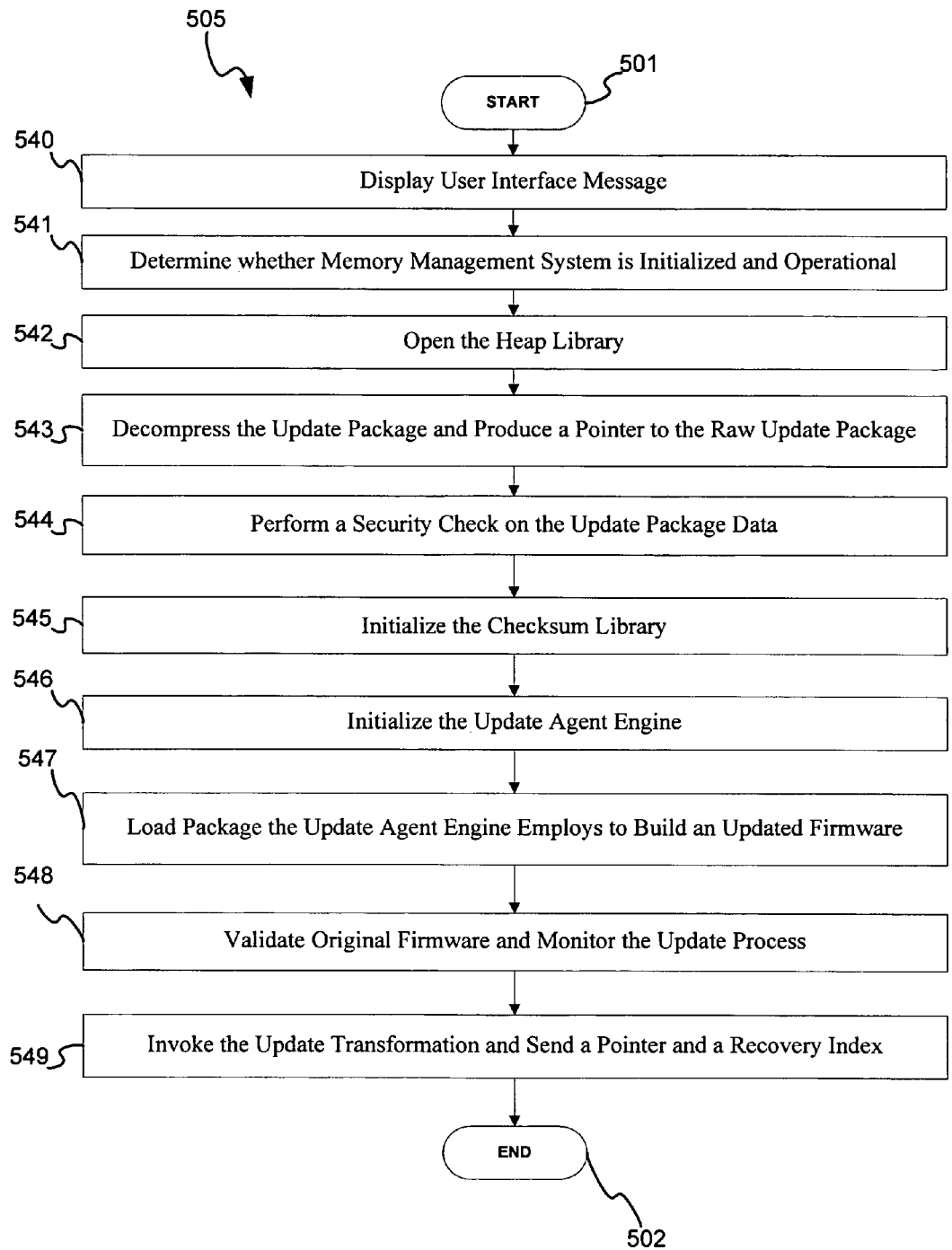
FIG. 5 is a flow diagram illustrating a portion of the exemplary method of fault tolerant updating of an update agent in an exemplary electronic device illustrated in FIG. 4 in accordance with an embodiment of the present invention.

FIG. 5 is a flow diagram 505 illustrating additional detail of a loop of instructions associated with the exemplary method of fault tolerant updating of an exemplary electronic device (such as mobile handset 107 illustrated in FIG. 1) illustrated in FIG. 4 (block 445) in accordance with an embodiment of the present invention.

The method may comprise displaying user interface messages (block 540). Displaying user interface messages may comprise using a customer-configured implementation for starting an update. The method may also comprise determining whether a memory management system is initialized and operational (block 541).

The method may also comprise opening a heap library (block 542), wherein the memory environment for executing the update may be established. The method may also comprise decompressing the update package 123 and producing a pointer to the raw update package (block 543). Decompression may comprise employing the zlib decompression implementation by Bitfone Corp. Decompression may also comprise employing a produced pointer to point to the decompressed update package employed for the update, which may be located in the RAM 125.

The method may also comprise performing a security check, such as an MD5 with RSA check, upon the update package 123 data/code (block 544). The method may also comprise initializing a checksum library and/or a CRC library (block 545) and initializing an update agent engine (block 546). A global void pointer and an allocated checksum pointer may be passed to an initialization routine during initialization. A global update structure may also be initialized. In an embodiment according to the present invention, the checksum pointer may be referenced by the global void pointer and may not be passed to other functions.

The method may also comprise loading an update package 123 that the update agent engine may employ to build an updated firmware/software image (block 547). Loading the update package 123 may also comprise checking the validity of the update package 123, both by evaluating the update package size and by evaluating the calculated checksum. A surveyor may support both an original firmware validation and also identification of an update procedure interruption, for example. The surveyor may be a component of the update agent 113 or the boot loader 111, for example. For integrations performed in a non-fault tolerant mode, the original firmware validation may be run, but identification of an update procedure interruption may be skipped. Skipping identification of an update procedure interruption may be accomplished by setting a device wrapper/driver function related to the surveyor. The surveyor function may return an index of recovery to be used later.

The method may also comprise validating an original firmware 117 and monitoring the update (block 548). The method may also comprise invoking an update transformation (transform phase indicator) and sending a pointer and a recovery index (block 549). The loop of instructions set forth above may be repeated as many times as necessary until the update is completed. The method illustrated in FIG. 5 ends at block 502, where the method may continue in FIG. 4 at block 446.

In an embodiment according to the present invention, interface functions may be provided in a C file to adjust direction between modules in the UASDK, for example. In an embodiment according to the present invention, electronic device integration may employ a baseline implementation, a library/libraries, and a plurality of program calls. One implementation may comprise implementing a program call to a baseline cyclic redundancy check, such as CRC32, for example. Another implementation may comprise linking a thumb predictor, for example. Another implementation may comprise implementing a baseline memory utility, for example.

In an embodiment according to the present invention, header files may contain all the prototypes that are to be implemented into the UASDK library/libraries for subsequent use during an update and incorporation into an update package, for example. The UASDK may call a flash erase function before a write-flash function.

To facilitate a non-fault-tolerant update of an update agent 113, the UASDK library/libraries may be compiled and linked to the interface files and device wrapper files. The output may be hexadecimal and/or plain binary form. The entry point to be used may be 0x10000. A scatter load file, such as for example, the file illustrated below may be used.

```
FLASH 0x10000 0x800
{
    FLASH 0x10000
    {   uainit.o (Init, +First)
        uabootmem.o
        <anon>
    }
    RAM_RO 0x1200000
    {
        * (+RO)
    }
    RAM_RWZI +0
    {
        * (+RW)
        * (+ZI)
    }
}
```

For a fault-tolerant update of the update agent 113, the UASDK library/libraries may be compiled and linked to the interface files and device wrapper files. The output here may be in plain binary form.

To support fault tolerant updating of an update agent, such as for example, update agent 113, tri-phase booting, as discussed above and with respect to FIG. 6 below, may be integrated.

Figure 6:
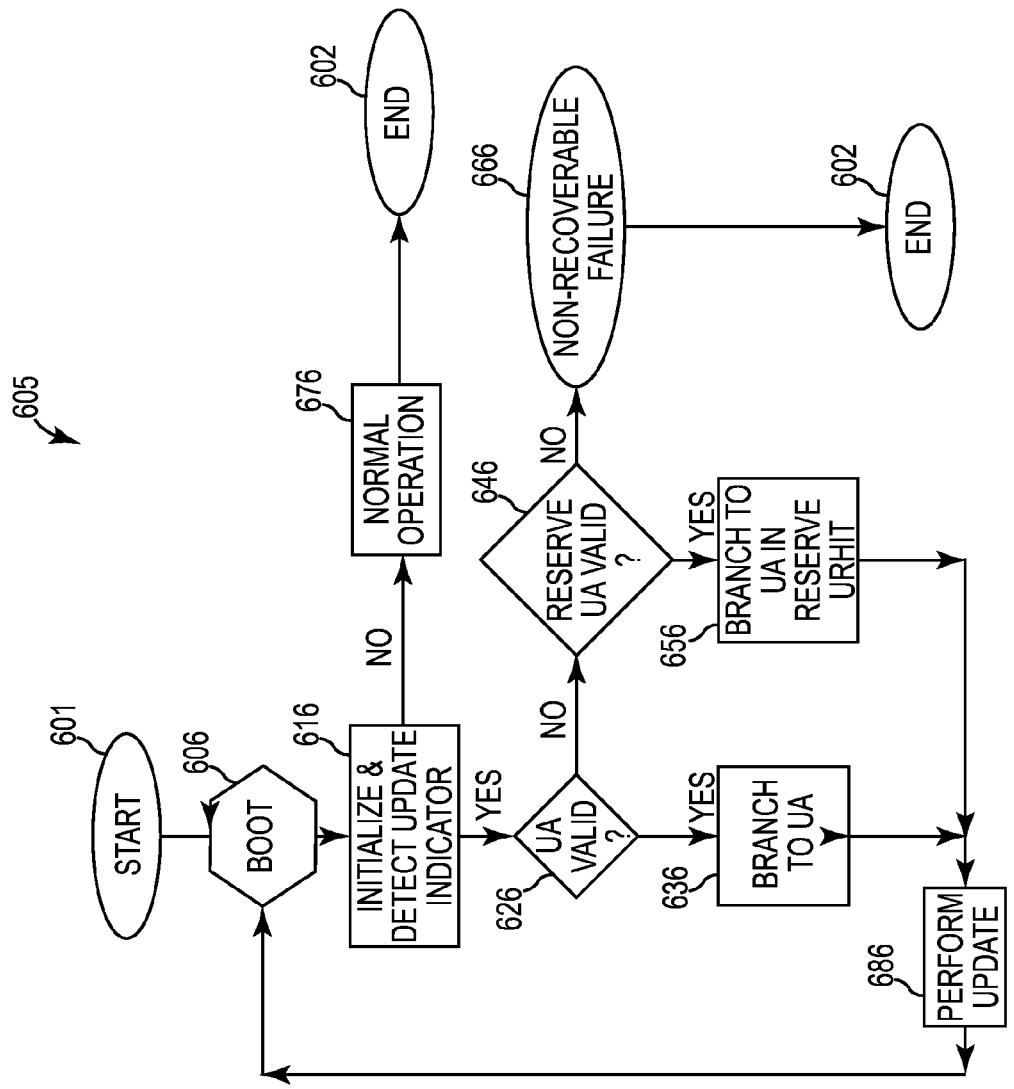
FIG. 6 is a flow diagram illustrating an exemplary tri-phase method of updating of an update agent in an exemplary electronic device in accordance with an embodiment of the present invention.

FIG. 6 is a flow diagram 605 illustrating an exemplary initialization, validation, and fault tolerant method of updating an update agent 113 in an exemplary electronic device in accordance with an embodiment of the present invention. In FIG. 6, the method may start at (block 601). An electronic device, for example, mobile handset 107 illustrated in FIG. 1, may be started, booted or rebooted (block 606). The method may also comprise initializing the electronic device, evaluating the update status indicator, for example, update status indicator 205 illustrated in FIG. 2, and detecting/determining whether an update package, such as for example update package 123 illustrated in FIG. 1 is present (block 616). If no update package 123 is present and/or no update is currently to be performed, the electronic device may initiate normal operation (block 676) and the procedure may conclude at end block 602.

In an embodiment according to the present invention, if an update package 123 is detected based upon evaluation of the update status indicator, for example update status indicator 205 illustrated in FIG. 2, the update agent, for example update agent 113 illustrated in FIG. 1, may be validated (block 626). If the update agent 113 is determined to be valid, i.e., operable and/or un-corrupted, the update may proceed to branch to the update agent 113 (block 636), wherein the update may be performed (block 686). Upon completion of the update, the electronic device may start up again or reboot (block 606). The electronic device may again evaluate the update status indicator 205 and determine whether another update package 123 is present (block 616), or determine whether the update has been completed. If no update package 123 is present, the update is complete, and/or no update is currently to be performed, the electronic device may initiate normal operation (block 676) and the procedure may conclude at end block 602.

In an embodiment according to the present invention, if an update package 123 is detected based upon evaluation of the update status indicator, for example update status indicator 205 illustrated in FIG. 2, the update agent, for example update agent 113 illustrated in FIG. 1, may be validated (block 626). If the update agent 113 is determined to be invalid, inoperable, and/or corrupted, a backup or reserve copy of the update agent 113, previously stored in non-volatile memory may be accessed, invoked, and validated (block 646). If the backup or reserve copy of the update agent 113 is also determined to be invalid, inoperable, and/or corrupted, a non-recoverable failure may occur (block 666) and/or the update may conclude at end block 602.

However, if the backup or reserve copy of the update agent 113 is determined to be valid, operable, and/or un-corrupted, the update may proceed to branch to the reserve copy of the update agent 113 in the reserved unit/bank of memory (block 656), wherein the update may be performed (block 686). Upon completion of the update, the electronic device may start up again or reboot (block 606). The electronic device may evaluate the update status indicator 205 and determine whether another update package 123 is present (block 616). If no update package 123 is present and/or no update is currently to be performed, the electronic device may initiate normal operation (block 676) and the procedure may conclude at end block 602.

Figure 7:
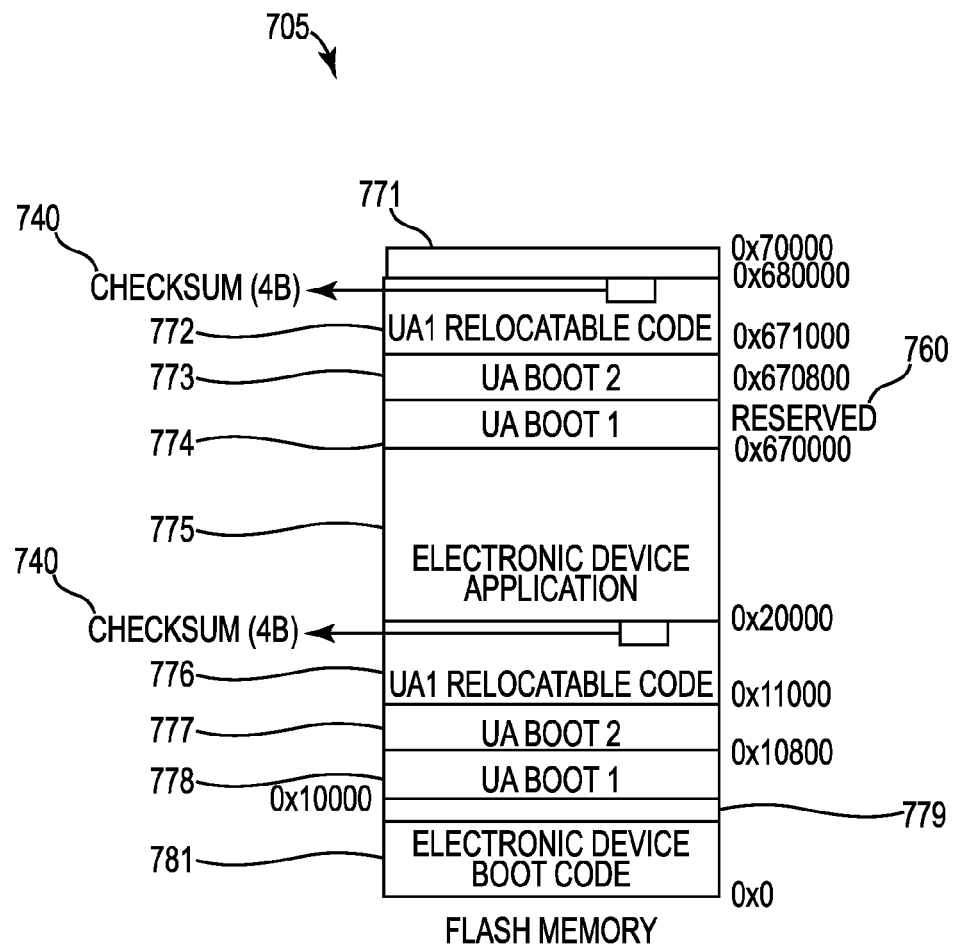
FIG. 7 is a block diagram illustrating an exemplary memory configuration for an exemplary electronic device in accordance with an embodiment of the present invention.

FIG. 7 is a block diagram illustrating an exemplary memory configuration 705 of a flash memory for an exemplary electronic device, for example mobile handset 107 illustrated in FIG. 1, in accordance with an embodiment of the present invention. The flash memory configuration 705 may comprise a block of memory 781 storing an electronic device boot code and an unspecified block of memory 779. The flash memory configuration 705 may also comprise a block of memory 778 storing an update agent (UA) boot 1 and another block of memory 777 storing an update agent (UA) boot 2. The flash memory configuration 705 may also comprise a block of memory 776 storing a UA1 re-locatable code. The block of memory 776 storing the UA1 re-locatable code may also comprise a sub-block checksum 740. The checksum 740 may be 4 bytes long, for example.

In an embodiment according to the present invention, the flash memory configuration 705 may also comprise a block of memory 775 storing electronic device application(s), for example. The flash memory configuration 705 may also comprise a block of memory 774 storing another UA boot 1 and another block of memory 773 storing another UA boot 2. The flash memory configuration 705 may also comprise a block of memory 772 storing another UA1 re-locatable code.

In an embodiment according to the present invention, the UA boot 1 stored in memory block 778 may be the same as the UA boot 1 stored in memory block 774, for example. The UA boot 2 stored in memory block 777 may be the same as the UA boot 2 stored in memory block 773, for example. The UA 1 re-locatable code stored in memory block 776 may be the same as the UA 1 re-locatable code stored in memory block 772, for example.

The block of memory 772 storing the UA1 re-locatable code may also comprise a sub-block storing a checksum 740. The checksum 740 may be 4 bytes long, for example. The flash memory configuration 705 may also comprise another unspecified block of memory 771.

In an embodiment according to the present invention, the boot binary files UA boot 1 and UA boot 2, stored in memory blocks 778 and 777, respectively, and/or 774 and 773, respectively, may be functionally similar and may be involved in update agent boot activities at different times. For example, one binary UA boot file may be adapted to perform a bootstrapping of the update agent 113 from an update agent default start location (such as for example, 0x100000) and the other binary UA boot file may be adapted to perform a bootstrapping of the update agent 113 from a reserved unit location (such as for example, 0x670800). Therefore, the UA boot 1 and the UA boot 2 binary files may perform the same function but on update agents stored in and invoked from different memory locations having different memory addresses.

In an embodiment according to the present invention, UA boot 1 may be adapted to initialize and relocate the update agent re-locatable code from an update agent write unit to RAM, for example, RAM 125 illustrated in FIG. 1.

In an embodiment according to the present invention, UA boot 2 may be adapted to initialize and relocate the update agent re-locatable code from an update agent reserved write unit to RAM, for example, RAM 125 illustrated in FIG. 1.

In an embodiment according to the present invention, the update agent re-locatable code, along with the bootstrap code, for example, UA boot 1 and/or UA boot 2, may be copied from default locations near 0x100000 to a reserved unit (reserved memory location) to ensure fault tolerant updating just prior to initiating a fault tolerant update of the update agent 113 in the electronic device.

Figure 8:
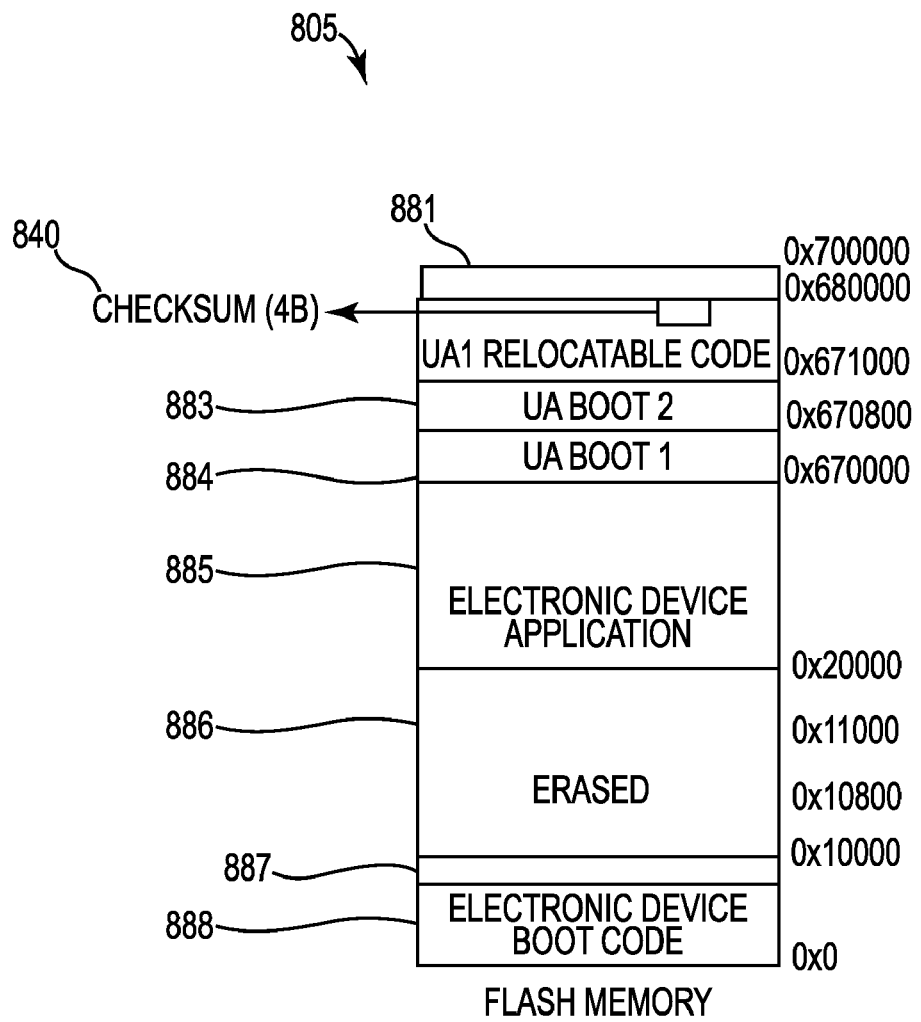
FIG. 8 is a block diagram illustrating an exemplary memory configuration for an exemplary electronic device in accordance with an embodiment of the present invention.

FIG. 8 is a block diagram illustrating an exemplary memory configuration 805 of a flash memory during an update of an update agent 113 for an exemplary electronic device in accordance with an embodiment of the present invention. The flash memory configuration 805 may comprise a block of memory 888 storing an electronic device boot code and an unspecified block of memory 887. The flash memory configuration 805 may also comprise an erased block of memory 886. The flash memory configuration 805 may also comprise a block of memory 885 storing an electronic device application(s). The flash memory configuration 805 may also comprise a block of memory 884 storing a UA boot 1 and a block of memory 883 storing another UA boot 2. The flash memory configuration 805 may also comprise a block of memory 882 storing a UA1 re-locatable code. The block of memory 882 storing the UA1 re-locatable code may also comprise a sub-block storing a checksum 840. The checksum 840 may be 4 bytes long, for example. The flash memory configuration 805 may also comprise another unspecified block of memory 881.

Figure 9:
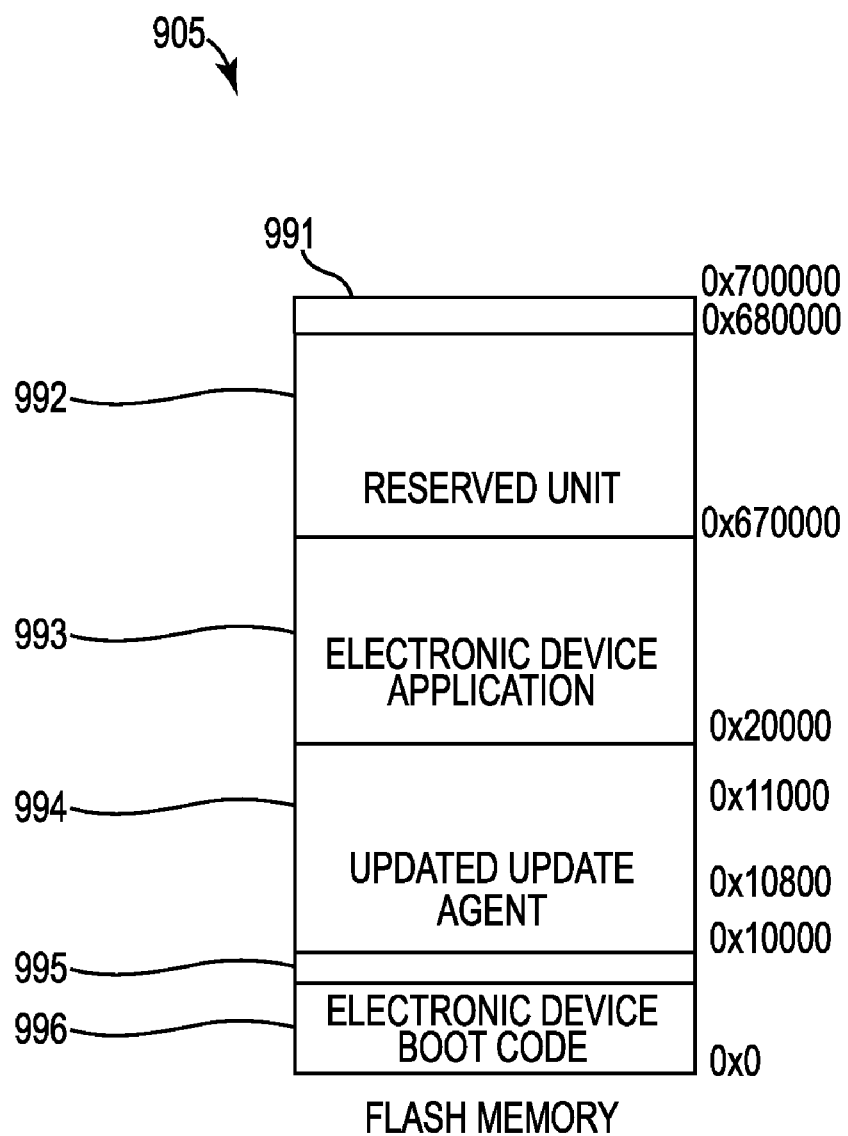
FIG. 9 is a block diagram illustrating an exemplary memory configuration for an exemplary electronic device in accordance with an embodiment of the present invention.

FIG. 9 is a block diagram illustrating an exemplary memory configuration 905 of a flash memory after a completed update procedure of an update agent 113 for an exemplary electronic device in accordance with an embodiment of the present invention. The flash memory configuration 905 may comprise a block of memory 996 storing an electronic device boot code and an unspecified block of memory 995. The flash memory configuration 905 may also comprise a block of memory 994 storing the updated update agent. The flash memory configuration 905 may also comprise a block of memory 993 storing an electronic device application(s). The flash memory configuration 905 may also comprise a reserved unit block of memory 992. The flash memory configuration 905 may also comprise another unspecified block of memory 991.

In an embodiment according to the present invention, the updated update agent 113 may remain associated with UA boot 1 and UA Boot 2 in order to support further updates to the updated update agent 113.

In an embodiment according to the present invention, to integrate a variation on the tri-phase boot method, an electronic device image may be built by modifying a pair of update agent scatter load files as set forth below.

The following exemplary first scatter load file may refer to two binary files that may be employed as outputs. At linking time, the entry point used may be 0x10000. The output files may be used in running a batch file, for example. For debugging purposes, an executable and linking format (ELF) file may also be employed.

```
FLASH 0x10000 0x800
{
    FLASH 0x10000
    {
        uainit.o (Init, +First)
        uabootmem.o
        <anon>
    }
}
RAM_UA 0x11000
{
    RAM_RO 0x1200000
    {
        * (+RO)
    }
    RAM_RWZI +0
    {
        * (+RW)
        * (+ZI)
    }
}
```

The following exemplary second scatter load file may also refer to two binary files that may be employed as outputs. At linking time, the entry point used may be 0x670800. The output files may be used in running a batch file, for example. For debugging purposes, an executable and linking format (ELF) file may also be employed.

```
FLASH 0x670800 0x800
{
    FLASH 0x670800
    {
        uainit.o (Init, +First)
        uabootmem.o
        <anon>
    }
}
RAM_UA 0x671000
{
    RAM_RO 0x1200000
    {
        * (+RO)
    }
    RAM_RWZI +0
    {
        * (+RW)
        * (+ZI)
    }
}
```

To make three binary files into one update agent executable binary file, the three binary files may be merged. In an embodiment according to the present invention, an exemplary utility tool may be employed to merge multiple binary files. The following is an exemplary command that may be used to accomplish the merge in an embodiment according to the present invention.

```
binmerge -o ua.bin 0x10000 0x10000 -f flash1 0x10000 flash2
   0x10800 ram_ro1 0x11000
```

In an embodiment according to the present invention, the validity of the update agent may be checked before invoking the update agent. To support a validity check of update agent, a checksum computation may be added to the update agent binary image at a checksum location. In an embodiment according to the present invention, an exemplary utility tool may be employed to incorporate the checksum into the image file. The following are exemplary command(s) may be employed.

```
mcsfile -o ua_cs.bin ua.bin 0xffdc -c crc32
binmerge -o uadl.bin 0x10000 0x10000 -f ua.bin 0x10000 ua_cs.bin 0x1ffdc
```

In an embodiment according to the present invention, an exemplary utility tool may be employed as a batch file for merging the binary files and incorporating the checksum for the update agent binary code as described above. To execute the batch file, an attached file containing the checksum for the update agent binary file may be copied into an appropriate directory.

In an embodiment according to the present invention, the boot loader 111 may detect the update status of the update agent and may also validate the update agent 113. Similarly, a cyclic redundancy check (for example, CRC32) based checksum computation code may also be incorporated into the electronic device image build environment for performing the computations.

Additional build commands for electronic device images may also be employed after creating a current electronic device image. The build commands may facilitate merging the update agent 113 and the electronic device image, for example.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A computer-readable storage medium comprising instructions for updating firmware or software in a mobile handheld electronic device, the computer-readable storage medium comprising:
    an update address block of memory,
    an update address stored in the address block of memory identifying where a package of update information for use by an updating software is stored in the mobile handheld electronic device;
    a return block of memory comprising a value to be returned when updating the electronic device has been completed;
    an indicator block of memory comprising a plurality of status indicators;
    wherein contents of one or more of the update address block of memory, the return block of memory, and the indicator block of memory are received by the mobile handheld electronic device before updating of the firmware or software; and
    wherein if it is determined that applying the package of update information updates the updating software based on at least one of the plurality of status indicators, the mobile handheld electronic device then executes instructions to cause the mobile handheld electronic device to perform a method comprising:
        before the updating software is modified, saving a copy of the updating software in a reserved flash bank within a particular flash memory section of non-volatile memory;
        after saving the copy, processing the package of updating information that updates the updating software; and
        after processing the package of update information, completing a tri-phase boot process using an update agent boot within the particular flash memory section, the tri-phase boot process involving a subsequent initialization, a validity check, and a branching functionality to branch between the updated updating software and the saved copy of the updating software, both within the particular flash memory section, based on the validity check.

2. The computer-readable storage medium according to claim 1, wherein the plurality of status indicators are employed by updating software for processing a plurality of executable instructions for converting a first version of firmware or software to a second version of firmware or software.

3. The computer-readable storage medium according to claim 1, wherein at least one of the plurality of status indicators is employed to indicate that an update is present in the electronic device and that an update is to be performed.

4. The computer-readable storage medium according to claim 1, wherein at least one of the plurality of status indicators is employed to indicate whether the firmware or software to be updated is valid and capable of being updated.

5. The computer-readable storage medium according to claim 1, wherein at least one of the plurality of status indicators is employed to indicate which phase of the update is currently performing.

6. The computer-readable storage medium according to claim 1, wherein at least one of the plurality of status indicators is employed to indicate that the update of the firmware or software to be updated is completed.

7. A method comprising:
    booting a mobile handheld electronic device comprising updating software;
    receiving one or more of:
        an update address identifying where a package of update information is stored in the mobile handheld electronic device,
        a value to be returned when updating the mobile handheld electronic device has been completed,
        a plurality of status indicators, and
        the package of information for updating firmware or software in the mobile handheld electronic device,
    before updating of the firmware or software, wherein one of the plurality of status indicators indicates that the updating software is to be updated;
    reserving a portion within a particular flash memory section of non-volatile memory and backing up code and information of the updating software before updating, and storing a copy of the updating software in the reserved portion, if the one of the plurality of status indicators indicates that the updating software is to be updated;
    storing the package of information within an additional portion of the particular flash memory section of non-volatile memory;
    updating the firmware or software in the mobile handheld electronic device using the package of information, wherein updating the software or firmware in the mobile handheld electronic device comprises executing a plurality of executable instructions for converting a first version of the software or firmware to a second version of the software or firmware; and after processing the package of information, completing a tri-phase boot process using an update agent boot within the particular flash memory section, the tri-phase boot process involving a subsequent initialization, a validity check, and a branching functionality to branch between updated updating software and the stored copy of the updating software, both within the particular flash memory section, based on the validity check.

8. The method according to claim 7, wherein the updating software is updatable in a fault tolerant manner.

9. The method according to claim 7, comprising storing the software and firmware in a compressed form and decompressing the software and firmware into random access memory for processing or updating.

10. The computer-readable storage medium according to claim 1, the computer-readable storage medium comprising:
   a software component adapted to survey and validate software or firmware to be updated in the mobile handheld electronic device to determine that the software or firmware is capable of being updated; and
   wherein the software component operates to identify an update interruption, when operating in a first mode, and the software component does not operate to identify the update interruption, when operating in a second mode.

11. The computer-readable storage medium according to claim 10, wherein identifying an update interruption provides a fault tolerant update and permits an interrupted update to be re-initiated where the interruption occurred.

12. A computer-readable storage medium for updating software or firmware in a mobile handheld electronic device, the computer-readable storage medium comprising:
   a device independent updating software component for updating software or firmware in the mobile handheld electronic device;
   an operating system software component;
   a firmware component corresponding to the mobile handheld electronic device; one or more software interface components that facilitate interaction between electronic device specific software comprising one or both of the operating system software component and the firmware component and application specific software comprising the device independent updating software component;
   an update address block of memory,
   an update address stored in the update address block of memory identifying where an update package for use by the device independent updating software component is stored in the mobile handheld electronic device;
   a return block of memory comprising a value to be returned when updating the mobile handheld electronic device has been completed;
   an indicator block of memory comprising status information;
   wherein contents of one or more of the update address block of memory, the return block of memory, and the indicator block of memory are received by the mobile handheld electronic device before updating of the firmware or software;
   wherein the mobile handheld electronic device is adapted to manage and adjust one or more of status information, update variables, and/or update functions; and
   wherein if it is determined based on at least one of the one or more of status information that the update package has been received to update updating software, the mobile handheld electronic device then executes instructions to cause the mobile handheld electronic device to perform a method comprising:
      before the updating software is modified, saving a copy of the updating software in a reserved flash bank within a particular flash memory section of non-volatile memory;
      after saving the copy, processing the update package to update the updating software; and
      after processing the update package, completing a tri-phase boot process using an update agent boot within the particular flash memory section, the tri-phase boot process involving a subsequent initialization, a validity check, and a branching functionality to branch between the updated updating software and the saved copy of the updating software, both within the particular flash memory section, based on the validity check.

13. The computer-readable storage medium according to claim 12, wherein electronic device specific software comprises
software adapted to operate in a mobile handheld electronic device of a pre-determined manufacturer.

14. The computer-readable storage medium according to claim 12, wherein application specific software comprises software adapted to perform a specific function that is independent of a mobile handheld electronic device.

15. The computer-readable storage medium according to claim 12, comprising software interfacing proprietary electronic device firmware or software and proprietary application specific updating software independent of a mobile handheld electronic device of a particular manufacturer.

16. The computer-readable storage medium according to claim 12, wherein the mobile handheld electronic device is adapted to perform a memory erase function before a memory write function for at least one component of a memory module.

* * * * *